3,071,607
VINYLLEAD COMPOUNDS
Eric C. Juenge, Baton Rouge, La., assignor to Ethyl Corporation, New York, N.Y., a corporation of Delaware
No Drawing. Filed Apr. 6, 1959, Ser. No. 804,076
4 Claims. (Cl. 260—437)

The present invention is concerned with novel vinyllead compounds, particularly lead compounds containing one or two unsubstituted vinyl groups.

Certain unsaturated organolead compounds are known in the art. For example, allyltriethyllead, allyltriphenyllead, 3-butenyltriethyllead, 3-butenyltriphenyllead, and bis(2-chlorovinyllead) dichloride and diacetate are disclosed. These compounds suffer particular disadvantage, however, so that such are of limited use and, as far as now known, have not been employed commercially. A particular disadvantage of such compounds is that they are not readily applicable for use in forming polymers, especially polymers which are straight chain having a minimum of cross-linking and in which the lead atom is linked directly to the hydrocarbon chain. Further, such materials are, for the most part, uneconomical.

An object of the present invention is to provide new and novel unsubstituted vinyllead compounds. A further object is to provide mono- and divinyllead compounds in which the lead atom has further attached thereto other groups, especially organic radicals. A specific object is to provide the novel mono- and divinyllead aryl compounds. These and other objects will be evident as the discussion proceeds.

The novel products of this invention comprise, in general, vinyllead compounds having at least one unsubstituted vinyl group and not more than three unsubstituted vinyl groups attached to the lead atom. The remaining valences of the lead atom are satisfied by organic radicals, or anions such as the halides and organic acid anions. The preferred compositions of this invention are the mono- and divinyllead phenyl compounds, that is, triphenylvinyllead ($\phi_3$PbCH=CH$_2$) and diphenyldivinyllead $\phi_2$Pb(CH=CH$_2$)$_2$.

To further describe the novel compositions, they comprise, in general, organolead compounds having between one to three vinyl groups attached directly to lead and the remaining valences of the lead are satisfied by organic radicals, particularly the alkyl or aryl radicals, or anions such as the halogens and organic acid anions. Such compounds can be depicted by the formula $$(H_2C=CH)_nPb(R)_{(4-n)}$$

wherein "n" is a small whole number from 1 to 3 inclusive and R is the aforementioned organic radicals or anions. Typical and illustrative examples of the compositions of this invention include trimethylvinyllead, triethylvinyllead, trihexylvinyllead, trioctylvinyllead, trioctadecylvinyllead, tri-2-butenylvinyllead, tri-4-octenylvinyllead, tricyclopentylvinyllead, tricyclohexylvinyead, triphenyvinyllead, trinaphthylvinyllead, dimethyldivinyllead, diethyldivinylead, dioctadecyldivinyllead, diphenyldivinyllead, methyltrivinyllead, ethyltrivinyllead, phenyltrivinyllead, benzyltrivinyllead, methylethyldivinyllead; vinyllead trichloride, divinyllead dichloride, trivinyllead chloride and the corresponding compounds wherein iodine, fluorine, or bromine are substituted for chlorine; vinyllead triacetate, divinyllead diacetate, trivinyllead trichloroacetate and the corresponding compounds wherein the organic acid anions have up to about 18 carbon atoms such as propionic, octanoic, decanoic, octadecanoic, myristic, oleic, linoleic, and the like. When the R groups are organic acid anions, it is preferred that they be anions of alkyl organic acids having up to about 8 carbon atoms. Where the R groups are organic radicals, such will, in general, have up to and including about 18 carbon atoms. It is to be understood that the hydrocarbon portions of the R groups can be further substituted with functional groups, particularly the halogens. It is preferred, however, that the R groups be alkyl or aryl hydrocarbon groups containing up to and including about 8 carbon atoms since such are of greater utility and will produce improved polymeric materials. Those compounds wherein the R groups are aryl, especially phenyl, comprise an even further preferred group of compounds. Two particularly advantageous products are triphenylvinyllead and diphenyldivinyllead.

The products of this invention exhibit unique properties over the prior known organolead compounds, for example, in that they are comparatively stable to the atmosphere and thermally stable, in most cases exhibiting little or no decomposition at temperatures as high as 150° C. and higher. Those compounds in which all substituents other than the unsubstituted vinyl groups attached to the lead are organic, are soluble in the usual organic solvents, particularly the hydrocarbons. Those in which the lead is attached to R groups which are a halide or organic acid anion, i.e. vinyllead salts, exhibit solubility in water without decomposition.

The novel products of this invention are not restricted in any manner by a particular mode of preparation. One advantageous procedure for their production is to react a vinyl Grignard reagent with the appropriate lead salt. For example, in order to prepare vinyllead compounds in which the remaining valences of the lead are organic radicals, one can employ organic lead halides or acetates. The vinyllead salts are readily prepared by reacting tetravinyllead with halogens or the corresponding halogen or organic acids. An alternative procedure is the partial reaction of the appropriate tetravalent lead salt, e.g. lead tetracetate, with a vinyl Grignard reagent in proportions to result in the requisite amount of vinyl groups. Reactions involving the employment of the vinyl Grignard reagent are best conducted in a cyclic ether, particularly tetrahdyrofuran. Other methods for the preparation of the novel compounds of this invention will be evident.

The novel products will be more completely understood and illustrated by the following examples wherein all parts are by weight.

*Example 1*

Vinyl magnesium bromide was prepared by reacting 1.06 parts of magnesium turnings with 4.66 parts of vinyl bromide in 35 parts of tetrahydrofuran. To the resulting solution was added 20.64 parts of triphenyllead chloride dissolved in 80 parts of tetrahydrofuran. The resulting mixture was refluxed with agitation for 24 hours. The mixture was then hydrolyzed with aqueous ammonium chloride and then permitted to separate. The tetrahydrofuran layer was separated and dried over anhydrous sodium sulfate. The dried tetrahydrofuran solution was then subjected to distillation at 65° C. The residue was extracted twice with 80 parts of boiling hexane and the extract was filtered to remove unreacted triphenyllead chloride. The hexane filtrate was then subjected to distillation to drive off the hexane. A yellow oil remained after the distillation. This oil was slowly distilled in a molecular still at 0.05 to 0.06 mm. mercury with a pot temperature of 160 to 170° C. resulting in a colorless, liquid distillate which was collected in a receiver immersed in a Dry Ice bath. A total of 4.77 parts of product were thus obtained representing a yield of 23.6 percent. This product was a pure white crystalline material. The crystals melted at 33 to 34° C. When subjecting a portion of the product to carbon and hydrogen analysis, 51.58 percent carbon and 4.07 percent hydrogen were found whereas triphenylvinyllead contains 51.59 percent carbon and 3.90 percent hydrogen.

*Example II*

Employing the procedure of Example I, 0.1306 mol of vinyl magnesium bromide in 75 parts of tetrahydrofuran were added to the reactor. Then 28.18 parts of diphenyllead dichloride and 75 parts of tetrahydrofuran were added thereto. All other conditions were maintained the same with the exception that the product was recovered employing petroleum ether in place of the hexane and the pot temperature during the molecular distillation was 120 to 155° C. The yield of product was 13.69 parts (50.1 percent) of a pale yellow liquid. It was found that this product commences to decompose at about 200° C. Upon analyzing a portion of the product, it was found to contain 46.10 percent carbon, 3.89 percent hydrogen, and 49.48 percent lead, whereas diphenyldivinyllead theoretically contains 46.25 percent carbon, 3.88 percent hydrogen and 49.87 percent lead.

*Example III*

Employing the procedure of Example I, phenyltrivinyllead is obtained when phenyllead triacetate is reacted with vinyl magnesium bromide in tetrahydrofuran.

*Example IV*

When trimethyllead bromide is reacted with vinyl magnesium bromide in tetrahydrofuran, trimethylvinyllead is produced.

*Example V*

Triethylvinyllead is obtained in high yield when 1 mole of vinyl magnesium bromide is reacted with 1 mole of triethyllead chloride in 700 parts of tetrahydrofuran at reflux temperature for ten hours.

*Example VI*

When reacting 1 mole of dioctyllead dichloride with 2 moles of vinyl magnesium bromide in tetrahydrofuran at the reflux temperature for 16 hours, dioctyldivinyllead is obtained.

*Example VII*

Employing the procedure of Example VI with the exception that 1 mole of vinyl magnesium bromide is reacted with 1 mole tricyclohexyllead bromide, tricyclohexylvinyllead is produced.

*Example VIII*

Tri-(2-butenyl)vinyllead is obtained when tri-(2-butenyl)-lead chloride is reacted with vinyl magnesium bromide in tetrahydrofuran at the reflux temperature for 6 hours.

*Example IX*

Tetravinyllead was prepared by slowly adding 0.737 mole of lead dichloride to 1.47 moles of vinyl magnesium chloride in 575 parts of refluxing tetrahydrofuran. The reaction mixture was then maintained at reflux for an additional 1 hour. The mixture was filtered to remove solids, then the tetrahydrofuran was removed from the liquid phase by distillation through a column, with a slight vacuum. A wet solid remained which was subjected to distillation of 0.5 mm. mercury pressure and 70 to 85° C. pot temperature over a 24-hour period. Re-distillation of the product gave a product boiling at 34° C. at 0.6 mm. mercury pressure in a yield of 34.3 percent which analyzed to be tetravinyllead. One part of the tetravinyllead was dissolved in 8 parts hexane, then dry hydrogen chloride gas was passed through this solution until a precipitate rapidly formed. This precipitate was filtered and washed with hexane. Then the filtrate was treated with additional hydrogen chloride. This procedure was repeated until no further precipitate was obtained. The combined solids weighed 0.31 part representing a yield of 30.3 percent. A portion of this product was sublimed at 90° C. and 1 mm. mercury pressure to give a white solid having melting point of 119 to 121° C. Analysis of this product showed 22.35 parts carbon and 2.90 parts hydrogen, whereas trivinyllead chloride contains 22.25 percent carbon, and 2.80 percent hydrogen.

*Example X*

In this run, 10 parts of tetravinyllead, prepared as in Example IX, was treated with a saturated solution of chlorine in acetic acid until a yellow color persisted. A white precipitate was formed which was filtered and the filtrate was again treated with chlorine in acetic acid. The solids formed from the second treatment were collected and combined with the original solids. The combined product, a white solid, amounted to 7.664 parts, representing a yield of 72 percent. The product was crystallized from methanol and water to give white crystals. Analysis showed 14.31 percent carbon and 1.80 percent hydrogen, whereas divinyllead dichloride contains 14.46 percent carbon and 1.82 percent hydrogen.

*Example XI*

Trivinyllead acetate was obtained in an 81 percent yield when employing the procedure of Example IX with the exception that 1.96 parts of glacial acetic acid was substituted for the hydrogen chloride in the absence of a solvent and 10 parts of tetravinyllead were employed with a silica gel catalyst. The product had a melting point of 168 to 170° C. with an identical melting point after sublimation. Analysis of the product showed 27.50 percent carbon and 3.70 percent hydrogen, whereas trivinyllead acetate contains 27.66 percent carbon and 3.48 percent hydrogen.

*Example XII*

Example XI was repeated with exception that 5.36 parts of trichloroacetic acid was substituted for the acetic acid. A rapid exothermic reaction occurred leaving a solid brownish product. The product was washed with petroleum ether, then sublimed at 180 to 195° C. and 1 mm. mercury pressure. The sublimed product did not melt below 300° C. A 74 percent yield was obtained. Analysis indicated 21.0 percent carbon and 1.76 percent hydrogen, whereas trivinyllead trichloroacetate contains 21.32 percent carbon and 2.01 percent hydrogen.

*Example XIII*

Trivinyllead octanoate is obtained when Example XI is repeated employing octanoic acid in place of acetic acid, with benzene as a solvent, and reacting at the reflux temperature for 3 hours.

*Example XIV*

When Example IX is repeated substituting dry hydrogen bromide for hydrogen chloride, trivinyllead bromide is obtained.

The above examples are presented by way of illustration of the novel products of this invention and it is not intended to be limited thereby. It is evident that other reactants can be substituted to produce the novel compounds mentioned hereinbefore.

The novel products are of considerable utility. For example, they can be added to motor fuels of the gasoline boiling range to enhance the antiknock quality of such fuels. A typical example is the addition of 2 grams of dimethyldivinyllead per gallon of motor fuel to result in an enhancement of the octane number of this fuel. A particularly advantageous use of the products of this invention is their employment as monomers to form polymeric materials. For example, when trimethylvinyllead is polymerized according to the procedures presently employed for vinylic materials such as ethylene, long chain, solid polymeric materials are obtained having a minimum amount of cross-linking and which have the lead atoms attached to the chain at intermediate points. The aromatic vinyllead compounds are particularly well suited as monomers. Such compounds are also readily polymerized according to the methods for polymerizing vinylic materials. The resulting solid polymers exhibit a greater radiation shielding against X-rays and other radiation. Triphenylvinyllead and diphenyldivinyllead are particularly well suited for this purpose with both the lead and phenyl groups affecting radiation shielding. These materials are also excellent monomers to be employed with other monomers to form copolymers. For example, triphenylvinyllead is readily polymerized with styrene to form a copolymer having additional phenyl groupings enhancing the radiation shielding of the resultant polymer. The vinyllead salts are useful as additives to greases to enhance lubricating properties. For example, when trivinyllead acetate is added in minor amount to a grease base, the lubrication properties are enhanced. These and other uses of the products of this invention will be evident to those skilled in the art.

Having thus described the novel products of this invention, it is not intended that they be limited except as set forth in the following claims.

I claim:

1. Lead compounds having between 1 and 3 unsubstituted vinyl groups attached to the lead, the remaining valences of the lead being satisfied by moieties selected from the group consisting of a halogen and an organic acid anion having up to and including about 18 carbon atoms.

2. A vinyl lead halide in which the lead is bonded to from one to three unsubstituted vinyl groups, the lead being also bonded to halogen, and the number of halogens in the molecule plus the number of unsubstituted vinyl groups in the molecule totalling 4.

3. A vinyl lead salt of a carboxylic acid that has up to 18 carbon atoms, the lead being bonded to from one to three unsubstituted vinyl groups, the number of such groups in the molecule plus the number of acid anions in the molecule totalling 4.

4. Trivinyl lead acetate.

References Cited in the file of this patent

UNITED STATES PATENTS

| | | |
|---|---|---|
| 2,134,625 | Shappirio | Oct. 25, 1938 |
| 2,272,133 | Shappirio | Feb. 3, 1942 |
| 2,356,476 | Shappirio | Aug. 22, 1944 |

OTHER REFERENCES

JACS–79, pages 5884 to 5889 (article by Maier et al.).
JACS—53, pages 3514 to 3518.
JACS—79, pages 515–517.
Chem. Reviews, vol. 2, (1925–1926), page 43.
Chem. Reviews, vol. 54 (1954), page 121.